United States Patent
Nishimoto (10) Patent No.: US 10,122,507 B2
(45) Date of Patent: Nov. 6, 2018

(54) OPTICAL TRANSMITTER AND METHOD OF CONTROLLING OPTICAL MODULATOR

(71) Applicant: Fujitsu Optical Components Limited, Kawasaki-shi, Kanagawa (JP)

(72) Inventor: Hiroshi Nishimoto, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/172,289

(22) Filed: Jun. 3, 2016

(65) Prior Publication Data

US 2017/0033871 A1    Feb. 2, 2017

(30) Foreign Application Priority Data

Jul. 28, 2015   (JP) ................ 2015-148664

(51) Int. Cl.

| | |
|---|---|
| H04B 10/10 | (2006.01) |
| H04B 10/08 | (2006.01) |
| H04B 10/516 | (2013.01) |
| H04B 10/564 | (2013.01) |
| H04L 5/00 | (2006.01) |
| H04B 10/50 | (2013.01) |
| H04L 27/00 | (2006.01) |
| H04L 27/20 | (2006.01) |

(Continued)

(52) U.S. Cl.
CPC ....... *H04L 5/0048* (2013.01); *H04B 10/5053* (2013.01); *H04B 10/50572* (2013.01); *H04B 10/50575* (2013.01); *H04L 5/0008* (2013.01); *H04L 27/0008* (2013.01); *H04L 27/2096* (2013.01); *H04L 27/36* (2013.01); *H04B 2210/075* (2013.01); *H04L 27/18* (2013.01)

(58) Field of Classification Search
USPC ......................... 398/183, 193, 198
See application file for complete search history.

(56) References Cited

U.S. PATENT DOCUMENTS

| | | | | |
|---|---|---|---|---|
| 5,764,820 | A | * | 6/1998 | De Dobbelaere ........ G02B 6/42 385/130 |
| 5,926,297 | A | * | 7/1999 | Ishikawa ............ G02B 6/29355 398/1 |

(Continued)

FOREIGN PATENT DOCUMENTS

| | | |
|---|---|---|
| JP | 2000-171766 | 6/2000 |
| JP | 2005-326548 | 11/2005 |
| JP | 2012-257164 | 12/2012 |

OTHER PUBLICATIONS

["Process Control Fundamentals", PAControl.com 2006.*

(Continued)

*Primary Examiner* — Oommen Jacob
(74) *Attorney, Agent, or Firm* — Staas & Halsey LLP (57) ABSTRACT

An optical transmitter has an optical modulator with a Mach-Zehnder interferometer, a pilot signal generator configured to generate a pilot signal to be superimposed on a drive signal for driving the optical modulator or on a substrate bias voltage applied to the optical modulator, and a controller configured to detect a ratio between a pilot component and a direct current component contained in a light output from the optical modulator and control at least one of an amplitude of the drive signal and a level of the substrate bias voltage such that the ratio becomes a constant value.

7 Claims, 10 Drawing Sheets

(51) Int. Cl.
*H04L 27/36* (2006.01)
*H04L 27/18* (2006.01)

(56) References Cited

U.S. PATENT DOCUMENTS

| | | | |
|---|---|---|---|
| 6,317,249 B1 | 11/2001 | Nakamoto et al. | |
| 7,655,900 B2* | 2/2010 | Kurosawa | G01R 15/247 250/227.14 |
| 7,822,348 B2* | 10/2010 | Webb | G02F 1/0123 359/245 |
| 9,158,137 B1* | 10/2015 | Abbas | G02F 1/0123 |
| 2002/0196507 A1* | 12/2002 | Stuart | H04B 10/2513 398/178 |
| 2003/0147577 A1* | 8/2003 | Kataoka | H04B 10/505 385/3 |
| 2003/0210914 A1* | 11/2003 | Khayim | H04B 10/505 398/197 |
| 2003/0231311 A1* | 12/2003 | Tucker | G01M 11/33 356/364 |
| 2004/0053577 A1* | 3/2004 | Pietilainen | H04L 27/2647 455/63.1 |
| 2004/0218920 A1* | 11/2004 | Piotte | H04B 10/00 398/32 |
| 2004/0246460 A1* | 12/2004 | Auracher | H01S 5/06832 356/4.01 |
| 2005/0002675 A1* | 1/2005 | Sardesai | H04B 10/505 398/183 |
| 2005/0068600 A1* | 3/2005 | Ogura | G02F 1/0123 359/238 |
| 2005/0105917 A1* | 5/2005 | Narusawa | H04B 10/50575 398/183 |
| 2005/0128556 A1* | 6/2005 | Jang | G02F 1/0123 359/239 |
| 2005/0254743 A1 | 11/2005 | Akiyama et al. | |
| 2008/0219678 A1* | 9/2008 | Doi | G02F 1/0123 398/198 |
| 2009/0244685 A1* | 10/2009 | Hoshida | G02F 1/0123 359/279 |
| 2010/0054738 A1* | 3/2010 | Yuki | H04J 14/06 398/65 |
| 2010/0119239 A1* | 5/2010 | Wang | H04B 10/50575 398/198 |
| 2010/0220952 A1* | 9/2010 | Smith | H01S 5/0683 385/14 |
| 2011/0026935 A1* | 2/2011 | Akiyama | H04B 10/5053 398/184 |
| 2012/0106951 A1* | 5/2012 | Wan | H04B 10/0775 398/26 |
| 2014/0270756 A1* | 9/2014 | Oda | H04B 10/0791 398/26 |
| 2017/0033871 A1* | 2/2017 | Nishimoto | H04L 5/0048 |

OTHER PUBLICATIONS

Espacenet Bibliographic data, Publication No. 2000-171766, published Jun. 23, 2000.
Espacenet Bibliographic data, Publication No. 2005-326548, published Nov. 24, 2005.
Japanese Platform for Patent Information, Publication No. 2012-257164, published Dec. 27, 2012.

* cited by examiner

OPTICAL TRANSMITTER AND METHOD OF CONTROLLING OPTICAL MODULATOR

CROSS-REFERENCE TO RELATED APPLICATIONS

This application is based upon and claims the benefit of priority of Japanese Patent Application No. 2015-148664 filed on Jul. 28, 2015, which is incorporated herein by reference in its entirety.

FIELD

The disclosures herein relate to an optical transmitter and a control method for an optical modulator.

BACKGROUND

In recent years, 100 Gigabit-per-second (Gbps) long-distance optical transmission has been implemented by dual-polarization quadrature phase-shift keying (DP-QPSK) using a digital coherent technology. To further improve transmission capacity, greater-level modulation schemes such as polarization division multiplexed 16 quadrature amplitude modulation (16-QAM) are being developed. Demand for downsizing optical transceivers is also increasing. At present, lithium-niobate (LiNbO$_3$) Mach-Zehnder (MZ) modulators are used typically as optical modulators. In order to realize downsized DP-QPSK or DP-16QAM transmitters, semiconductor Mach-Zehnder modulators are desired.

There is an intrinsic problem in semiconductor optical modulators in that the modulation characteristic (i.e., the relationship between applied voltage and amount of optical phase rotation, or the voltage to phase change characteristic) varies depending on the wavelength of a light beam input to the modulator. In semiconductor optical modulators, the absorption edge wavelength of the semiconductor material changes according to applied voltage, and the phase of light is modulated making use of the phase shift due to absorption based on Kramers-Kronig relations. Hence, semiconductor optical modulators have wavelength dependency such that the closer to the absorption-edge-wavelength the light to be modulated is, the greater the optical phase change with respect to the voltage change becomes.

On the other hand, because the absorption edge wavelength of a semiconductor optical modulator changes in response to a change in substrate bias voltage, the modulation characteristic can be controlled. In this context, a "substrate bias voltage" is a direct-current (DC) bias voltage for controlling a modulator operating point (which voltage corresponds to a center voltage of a high-frequency electric signal for driving the optical modulator). The substrate bias voltage is distinguished from other types of bias voltages. Other types of bias voltages include an optical phase bias voltage for controlling a phase difference between light beams propagating through the two optical waveguides of a Mach-Zehnder interferometer, and a π/2 shift bias voltage for adjusting the optical phase difference between two Mach-Zehnder interferometers to π/2 radians when performing quadrature (or orthogonal) phase shift keying.

To address the wavelength dependency of the modulation characteristic of semiconductor optical modulators, several techniques for controlling a substrate bias voltage or amplitude of a modulator drive signal according to the wavelength of input light are proposed. The first technique is to set the substrate bias voltage to a predetermined level according to the wavelength, whereby the modulator can be driven at a constant amplitude of a drive signal regardless of a change in wavelength. See, for example, Japanese Laid-open Patent Publication No. 2005-326548 A.

The second technique is to perform feedback control on the substrate bias voltage or drive signal amplitude so as to set the optical phase modulation depth to 100%. A low frequency signal is superimposed on driving data signals and output light signals are monitored. Responsive to the monitoring result, at least one of the substrate bias voltage and the amplitude of the modulator drive signal is/are controlled. See, for example, Japanese Laid-open Patent Publication No. 2012-257164 A.

To deal with temperature change in optical modulators, a Peltier device is generally used to maintain the temperature of optical modulators constant.

In a semiconductor Mach-Zehnder modulator, the voltage to phase change characteristic may undergo change over time or aging. Driver circuits (or drive amplitudes) to drive the respective optical waveguides of an MZ interferometer may also undergo change over time.

Meanwhile, there may be a case in which the optical phase modulation depth is set to an arbitrary level under 100%, depending on a modulation scheme employed. However, the second technique described above postulates the modulation depth of 100% and is unsuitable to expand its control scheme to an arbitrary modulation depth.

Accordingly, there is a demand for an optical transmitter and a technique for controlling an optical modulator that can maintain the optical phase modulation index constant at a desired depth even in the environment where the operating characteristic of the optical modulator varies.

SUMMARY

According to an aspect of the disclosures, an optical transmitter has an optical modulator with a Mach-Zehnder interferometer, a pilot signal generator configured to generate a pilot signal to be superimposed on a drive signal for driving the optical modulator or on a substrate bias voltage applied to the optical modulator, and a controller configured to detect a ratio between a pilot component and a direct current component contained in a light output from the optical modulator and control at least one of an amplitude of the drive signal and a level of the substrate bias voltage such that the ratio becomes a constant value.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

The embodiments described below provide exemplified structures and a technique of maintaining a modulation index constant at a desired modulation depth even under the environment where the operating characteristic and/or the voltage to phase change characteristic of an optical modulator may vary due to variable factors such as change over time, temperature change, or change in light source wavelength.

There are several occasions in which the modulation depth of an optical modulator is set less than 100% depending on a modulation scheme, as described below.

(1) The average modulation depth is reduced from 100% in order to bring the peak level of the waveform under 100%. This may happen during Nyquist pulse modulation because of large overshoot produced in the driving waveform.

(2) The modulation depth is reduced to guarantee the linearity in the voltage to phase change relationship. It is desired for Nyquist pulse modulation or multilevel quadrature phase modulation (such as 16 QAM) to have linearity in the voltage to phase change relationship. However, in semiconductor optical modulators, the voltage to phase change relationship is typically nonlinear. To ensure the linearity, the modulation depth is reduced.

Concerning the variable factors exemplified above, the embodiment is configured to deal with change over time by performing feedback control. Temperature change may be dealt with by stabilizing the temperature using a Peltier device, or alternatively by performing feedback control. When using a semiconductor optical modulator, wavelength dependency may be dealt with by performing feed-forward or feedback control on a substrate bias voltage. An example of feedback control is superimposing a low frequency pilot signal onto the substrate bias or drive amplitude and controlling the substrate bias or the drive amplitude such that the ratio between a low frequency pilot component and a direct current component (average optical power) contained in a monitor signal of output light from the optical modulator becomes constant. This feedback control can maintain the modulation index constant at a desired modulation depth.

First Embodiment

Figure 1:
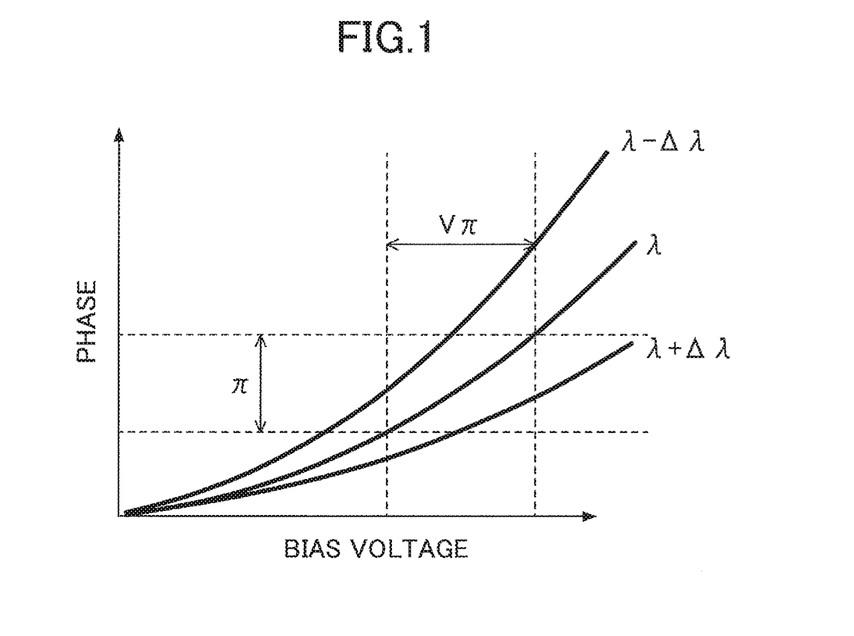
FIG. 1 illustrates a voltage to optical phase change characteristic of a semiconductor optical modulator.
Figure 2:
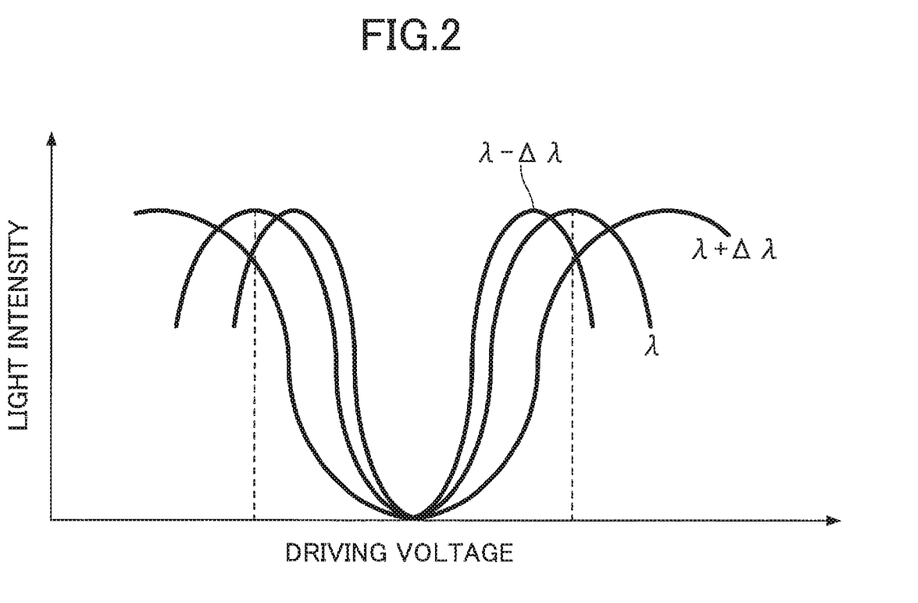
FIG. 2 illustrates a relation between driving voltage and light intensity in an optical modulator with a Mach-Zehnder interferometer.
Figure 3:
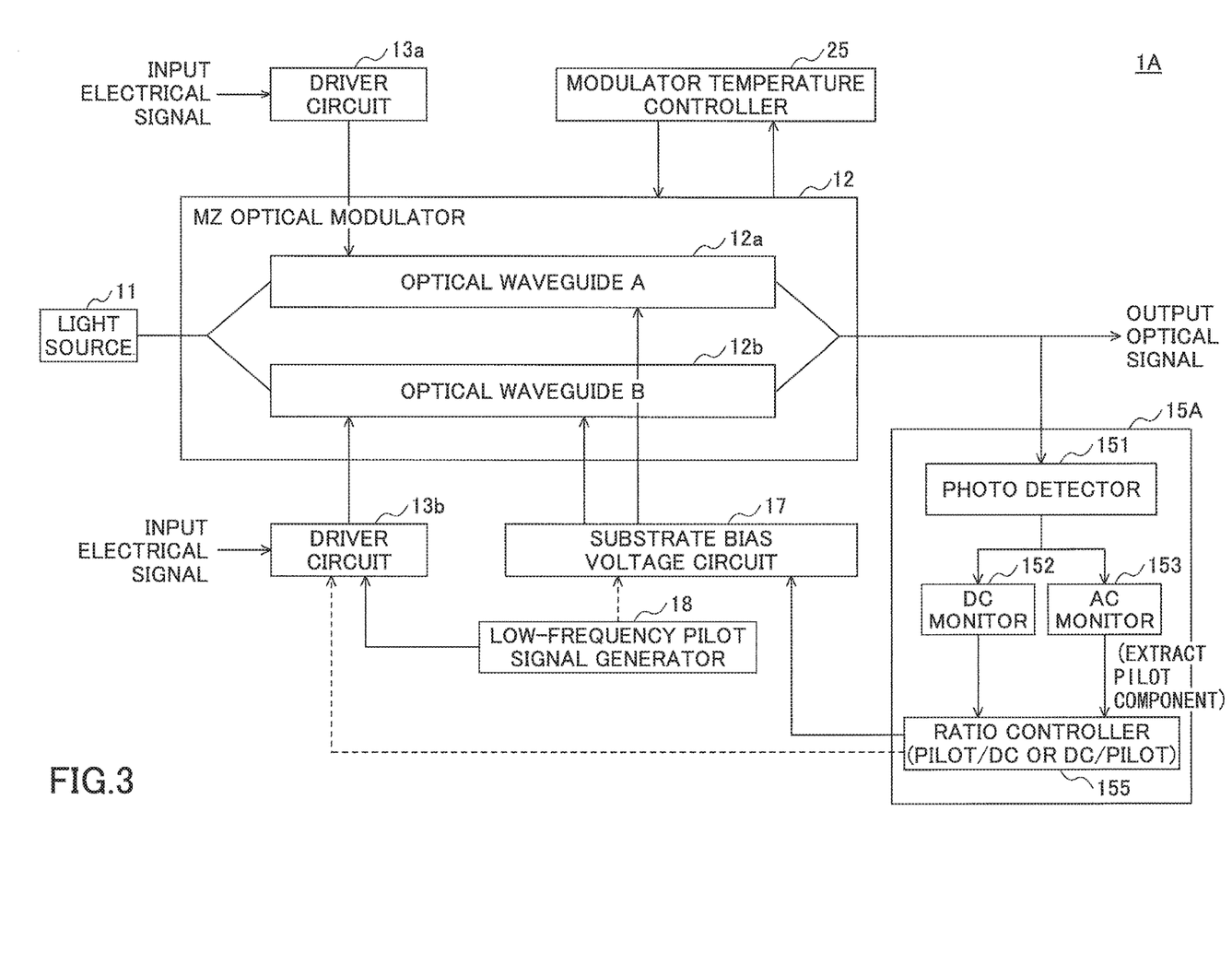
FIG. 3 is a schematic diagram of an optical transmitter according to the first embodiment.

FIG. 3 is a schematic diagram of an optical transmitter 1A according to the first embodiment. The optical transmitter 1A has a light source 11, a Mach-Zehnder optical modulator 12 (which may be referred to simply as "optical modulator 12" in the following description), driver circuits 13a and 13b to drive the optical modulator 12, and a controller 15A. The controller 15A has a photo detector 151, a direct current (DC) monitor 152, an alternating current (AC) monitor 153, and a ratio controller 155. The ratio controller controls a substrate bias voltage or a drive amplitude such that a ratio between a pilot component a direct current component (or an average optical power) contained in a monitor signal detected by the photo detector 151 becomes constant.

The light source 11 is, for example, a wavelength-tunable semiconductor laser suitable for use in wavelength division multiplexing (WDM) transmission systems. The optical modulator 12 has a Mach-Zehnder interferometer formed by a pair of optical waveguides 12a and 12b. A light emitted from the light source 11 is split into two paths and input to the optical waveguides 12a and 12b of the optical modulator 12. The driver circuits 13a and 13b amplify input electrical signals and generate high frequency (e.g., 32 Gbps) drive signals for modulating light waves travelling through the associated optical waveguides 12a and 12b. The drive signals applied to the optical waveguides 12a and 12b have opposite polarities and the light waves through the optical waveguides 12a and 12b are modulated at opposite phases. The modulated light waves from the optical waves 12a and 12b are combined and output from the optical modulator 12. The output signal is an optical signal subjected to binary phase shift keying (BPSK) between 0 radians and $\pi$ radians.

The optical transmitter 1A also has a substrate bias voltage circuit 17, a modulator temperature controller 25, and a low frequency pilot signal generator 18. The substrate bias voltage circuit 17 controls substrate bias voltages applied to the optical waveguides 12a and 12b. The modulator temperature controller 15 controls temperature of the optical modulator 12. The low frequency pilot signal generator 18 generates a pilot signal of sufficiently low frequency (e.g., several kilohertz) compared with the drive signal frequency. The pilot signal is supplied to the driver circuit 13b or the substrate bias voltage circuit 17. The dashed arrow extending from the low frequency pilot signal generator 18 to the substrate bias voltage circuit 17 represents that the pilot signal may be input to the substrate bias voltage circuit 17 in place of the driver circuit 13a (or driver circuit 13b). In FIG. 3, signal electrodes to which the drive signal and the substrate bias voltage are applied are omitted for the simplification purpose of drawing. Signal electrodes are travelling wave electrodes provided to the optical waveguides 12a and 12b, respectively, along the light propagation direction. The driver circuits 13a and 13b are AC coupled to the signal electrodes via capacitors. Substrate bias voltages are DC coupled to the signal electrodes.

The controller 15A monitors a portion of the light signal output from the optical modulator 12 at the photo detector 151, and extracts a pilot component contained in the monitor signal at the AC monitor 153. The DC monitor 152 detects a direct current component or average optical power. A photo-electric current output from the photo detector 151 is converted to an electric voltage signal by a transimpedance amplifier and the electric voltage signal is supplied to the AC monitor 153 and the DC monitor 152. The ratio controller 155 controls the substrate bias voltage or the drive amplitude such that the ratio between the pilot component and the DC component becomes constant. The ratio may be a pilot to DC (pilot/DC) ratio or a DC to pilot (DC/pilot) ratio; either can be used suitably. The dashed arrow extending from the ratio controller 155 to the driver circuit 13b represents that the control signal may be supplied to the driver circuit 13b in place of the substrate bias voltage circuit 17.

When the AC monitor 153 detects the pilot component in an analog manner, the pilot signal generated at the low frequency pilot signal generator 18 may be supplied to the AC monitor 153 for synchronous detection. Alternatively, the function of the AC monitor 153 may be realized using firmware.

By controlling the ratio between the pilot component and the DC component (or average optical power) to a constant value, the optical phase modulation depth (which is referred to simply as "modulation depth") can be maintained at a constant level regardless of the change in voltage to phase change characteristic of the optical modulator 12. The value of the ratio between the pilot component and the DC component corresponds to a modulation depth. In other words, by changing the target value of the ratio between the pilot component and the DC component, the modulation depth can be changed. Besides, the ratio between the pilot component and the DC component varies according to the modulation scheme (such as BPSK, QPSK, 16QAM, etc.). Accordingly, a different target value may be used when carrying out ratio control depending on the modulation scheme. In the example illustrated in FIG. 3, a pilot/DC ratio selected for a BPSK modulation depth is used. The target ratio between the pilot component and the DC component may be recorded in and read out from a memory when setting the modulation depth. Alternatively, the ratio may be calculated every time a modulation depth is set.

Figure 4:
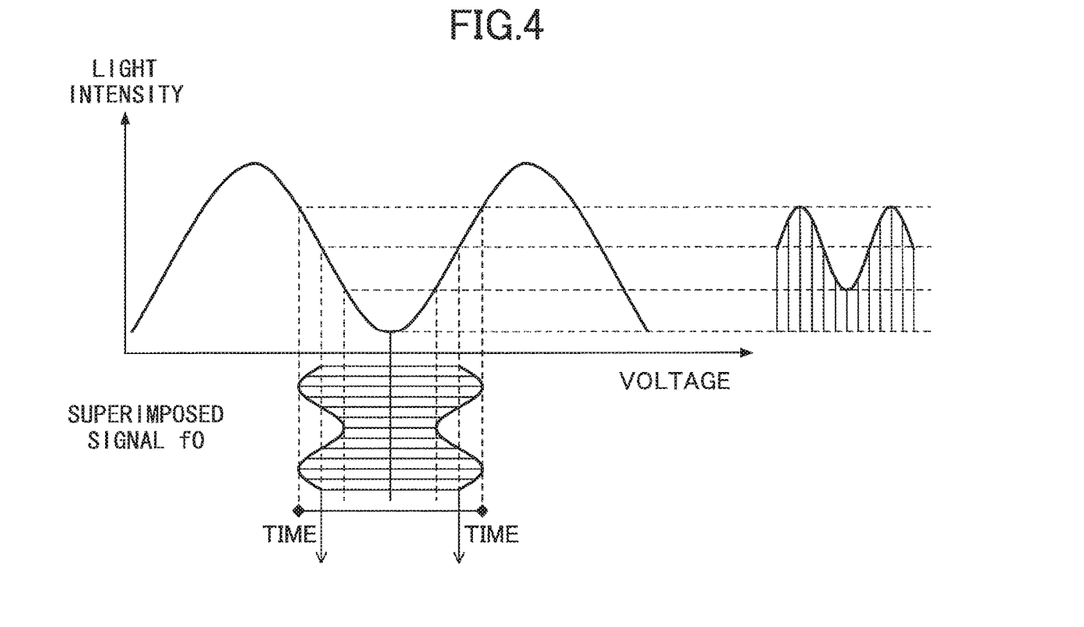
FIG. 4 is a diagram to explain superimposition of a low frequency pilot signal and a pilot component contained in an output light.

Referring to FIG. 4 to FIG. 9, the basic concept of the control scheme using a ratio between the pilot component and the DC component is explained below. FIG. 4 illustrates a low frequency pilot signal superimposed onto the substrate voltage (or the drive signal) and a pilot component detected from the output light of the optical modulator. This figure illustrates a case with a modulation depth of 50%. When a pilot signal with a low frequency f0 is applied to a drive signal that produces a phase rotation between the light waves modulated at the optical waveguides 12a and 12b, the amplitude of the drive signal slightly fluctuates at the low frequency f0. In optical phase modulation using a Mach-Zehnder interferometer, modulation is performed such that the center of the drive signal agrees with the minimum point of light intensity. When modulation is performed with a drive signal whose amplitude swings from the center at the minimum point of the light intensity to the intensity peaks of the both sides, 100% optical phase modulation is achieved. In this case, there is no pilot component appearing in the output light from the optical modulator. When the modulation depth is less than 100%, there is a pilot component appearing in the output light as illustrated in the right hand side of FIG. 4.

Figure 5:
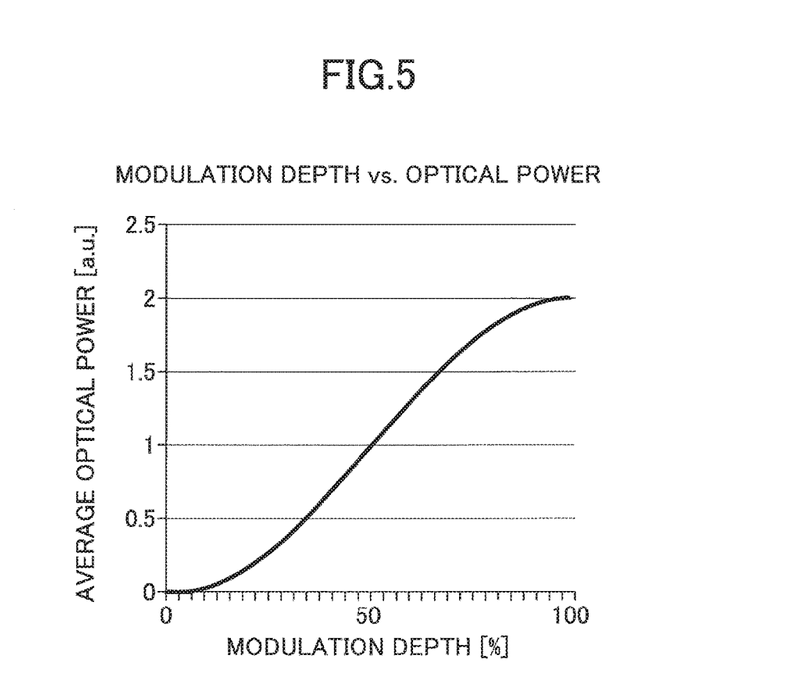
FIG. 5 illustrates a relationship between modulation depth and average optical power.

FIG. 5 illustrates a relationship between modulation depth and average optical power of the optical modulator. The first index of the ratio control is the DC component contained in the monitor light. The CD component represents an average optical power of the optical modulator 12. The smaller the modulation depth, the lower the average optical power is. From this chart, a solution may be conceived to maintain the modulation depth constant by controlling the average optical power to a constant level. However, the average optical power is likely to change due to other factors such as change in the output light from a laser diode (LD) of the light source 11 or change in loss in the optical modulator 12. Accordingly, using only the average optical power is insufficient.

The second index of ratio control is a pilot component. In optical phase modulation using a Mach-Zehnder interferometer, the voltage to light intensity curve is similar to a sine wave (representing a trigonometric function) as illustrated in FIG. 4. The slope of the light intensity (i.e., the average optical power) varies depending on the modulation depth as illustrated in FIG. 5. Accordingly, a solution may be conceived to maintain the intensity slope of the optical signal constant, that is, maintain the modulation depth constant, by keeping the pilot component contained in the output light of the optical modulator 12 constant.

Figure 6:
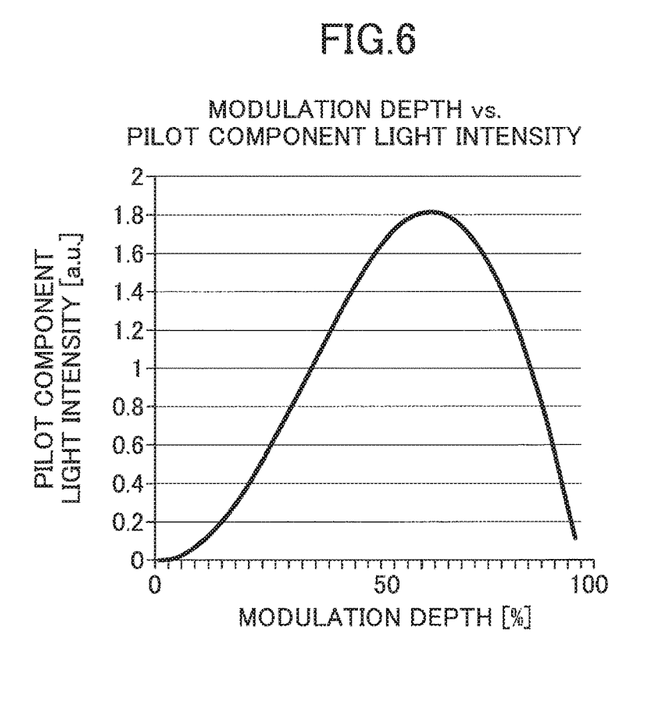
FIG. 6 illustrates a relationship between modulation depth and light intensity of a pilot component.

However, the direction of slope of the intensity of the pilot component contained in the output light from the optical modulator 12 is reversed at or near modulation depth of 60%, as illustrated in FIG. 6. It is difficult to determine the direction of control at or near 60% of modulation depth. Besides, the intensity of the pilot component also varies similarly to the average optical power due to change in the output light of LD in the light source 11 or change in loss in the optical modulator 12.

Figure 7:
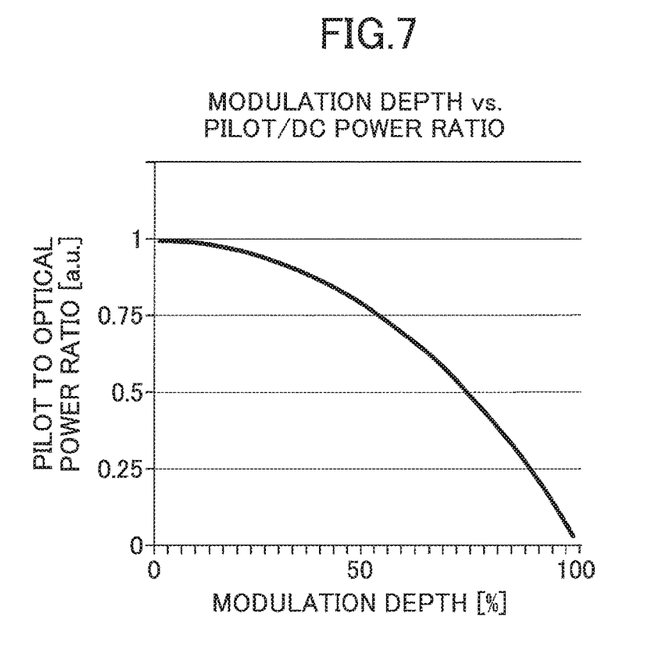
FIG. 7 illustrates a relationship between modulation depth and pilot-to-optical power ratio.

To solve these issues, a ratio between the pilot component and the DC component (or the average optical power) contained in the output light from the optical modulator 12 is used in the embodiment. Using the ratio, influence from variable factors such as change in LD output light or optical loss, except for modulation depth, can be cancelled. In addition, the direction of change in pilot-to-DC ratio with respect to the modulation depth is the same direction as illustrated in FIG. 7. In using the ratio between the pilot component and the DC component as a criterion, the direction of control is definite and the modulation depth can be controlled more simply to a constant level.

For example, when the modulation depth is set to 75% and when the pilot-to-DC ratio is less than 0.5, then control is made in the direction increasing the ratio. When the pilot-to-DC ratio is greater than 0.5 at the 75% modulation depth, then the control is made in the direction decreasing the ratio. It is noted that the vertical axis of FIG. 7 represents the ratio normalized between 0 and 1.

Figure 8:
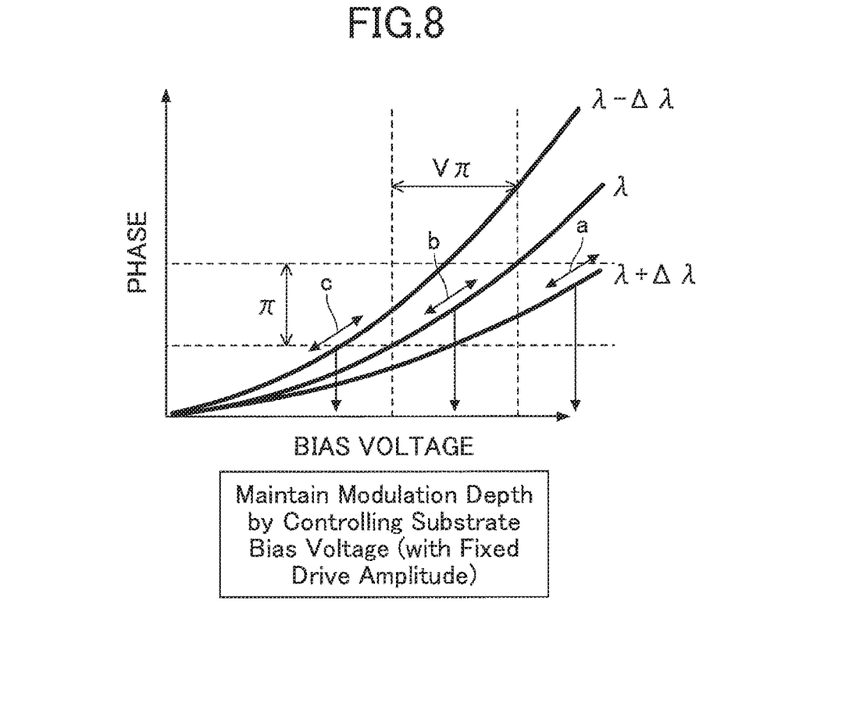
FIG. 8 is a diagram to explain a scheme for maintaining the modulation depth constant by controlling a substrate bias voltages.

To keep the pilot/DC or DC/pilot ratio constant and achieve a constant modulation depth at a desired level, several schemes may be employed. For example, a substrate bias voltage may be controlled. Alternatively, the amplitude of a drive signal may be controlled. FIG. 8 is a chart to explain a control scheme for maintaining the modulation depth constant by adjusting the substrate bias voltage. In this case, the amplitude of the drive signal may be fixed. As the wavelength $\lambda$ of the light source varies, a half-wavelength voltage $V\pi$ changes. When the wavelength $\lambda$ of the light source shifts toward the longer wavelength ($\lambda+\Delta\lambda$), the half-wavelength voltage $V\pi$ increases. When the wavelength $\lambda$ of the light source shifts toward the shorter wavelength ($\lambda-\Delta\lambda$), the half-wavelength voltage $V\pi$ decreases. The voltage to phase change characteristic (or the modulation characteristic) varies due to not only change in the wavelength of the light source, but also temperature change or change over time. Controlling the ratio between the pilot component and DC component so as to be constant means to keep the slope of the voltage to phase change curve (or the modulation characteristic curve) constant as indicated by the bidirectional arrows "a", "b" and "c" in FIG. 8. This control corresponds to adjusting in phase the substrate bias voltage applied to the optical modulator 12 within a range with the same slope regardless of change in temperature or wavelength of the light source.

Figure 9:
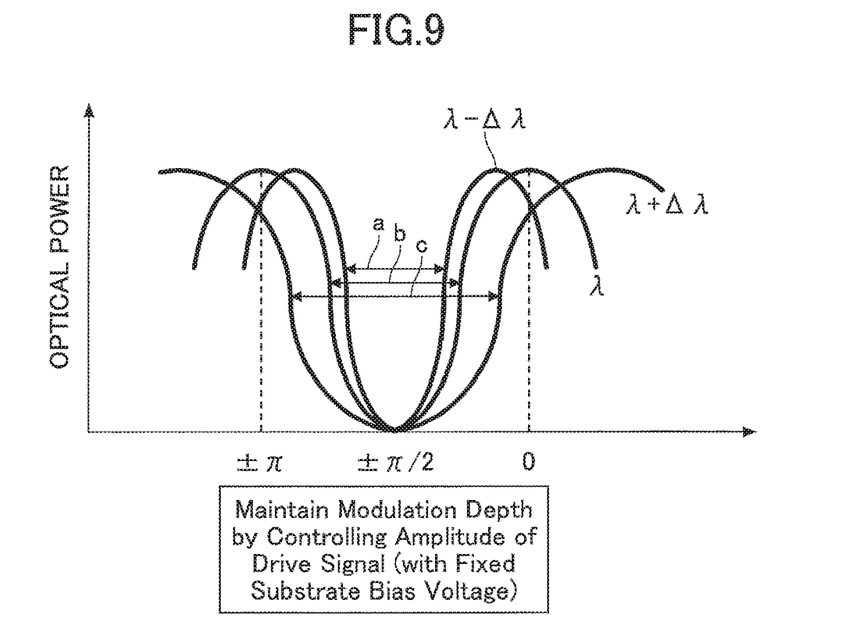
FIG. 9 is a diagram to explain a scheme for maintaining the modulation depth constant by controlling a drive amplitude.

FIG. 9 is a chart to explain a control scheme for maintaining the modulation depth constant by adjusting the amplitude of the drive signal for the optical modulator. In this case, the substrate bias voltage may be fixed. Without phase difference between the light waves traveling through the optical waveguides 12a and 12b of the optical modulator 12, the combined light become a high power signal under constructive interference. With a phase difference of π radians, the combined light becomes a low power signal under destructive interference. The phase shift between 0 radians and π radians corresponds to modulation depth of 100%. By decreasing the quantity of phase shift less than π radians, a modulation depth less than 100% can be set.

Under the fixed substrate bias voltage, the phase gradient of the optical modulator 12 changes due to variable factors such as change in wavelength of the light source, temperature change, or change over time. When the wavelength of the light source is tuned from λ to λ+Δλ, the phase gradient to achieve the same modulation depth becomes gentle. When the wavelength of the light source is tuned from λ to λ−Δλ, the phase gradient to achieve the same modulation depth become steep. Controlling the ratio between the pilot component and DC component so as to be constant means to keep the modulation depth constant by adjusting the amplitude of the drive signal as indicated by the bidirectional arrows "a", "b" and "c" in FIG. 9. The horizontal axis of the chart of FIG. 9 represents a bias voltage and the point at ±π/2 indicates the optimum operating point (corresponding to the center of the amplitude of the drive signal).

In this manner, by controlling the ratio between the pilot component and the DC component, a desired modulation depth can be maintained regardless of change over time in the optical modulator 12 or the driver circuits 13, change in wavelength of the light source 11, temperature change, initial variation, etc.

Returning to FIG. 3, in the optical transmitter 1A, the controller 15A performs feedback control to deal with change in wavelength of the light source 11 and change over time at the optical modulator 12 and the driver circuits 13. As for temperature change, the modulator temperature controller 25 performs temperature control using a Peltier device or other suitable devices. Instead of using a temperature control device, temperature change may be feedback controlled by the controller 15A. The above-described control scheme based upon the ratio between the pilot component and the DC component contained in the output light from the optical modulator 12 is not limited to controlling semiconductor optical modulators, but is applicable to optical modulators making use of the electro-optic effect. Although electro-optic modulators have less wavelength dependency compared with semiconductor optical modulators, the above-described control scheme is still effective. In the application to electro-optic modulators, an arbitrary level of modulation depth can be kept constant regardless of change over time or temperature change by controlling the amplitude of the drive signal according to the ratio between the pilot component and the DC component. See the dashed arrow extending from the ratio controller 155 to the driver circuit 13b in FIG. 3.

Second Embodiment

Figure 10:
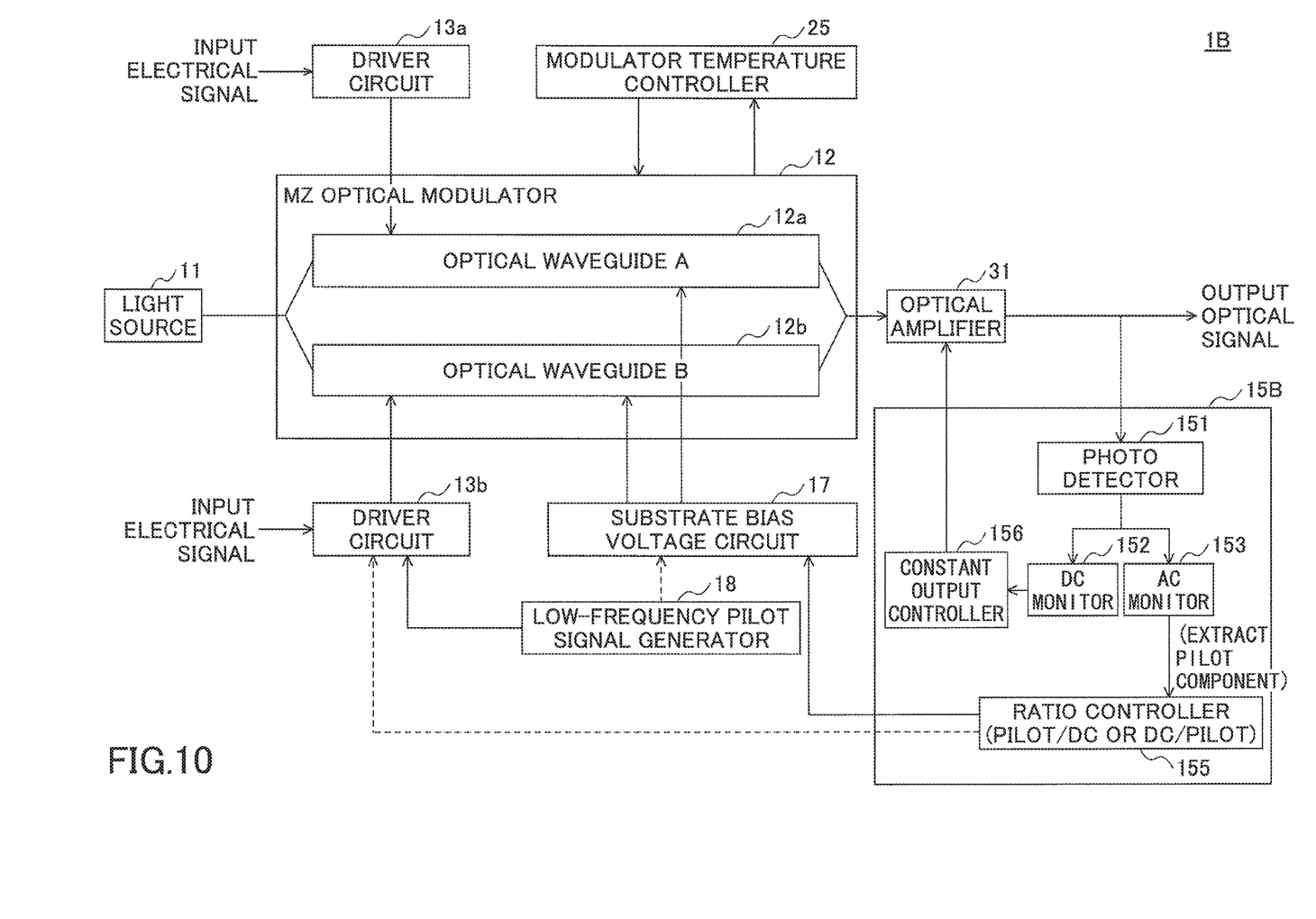
FIG. 10 is a schematic diagram of an optical transmitter according to the second embodiment.

FIG. 10 is a schematic diagram of an optical transmitter 1B according to the second embodiment. The basic structure of the optical transmitter 1B is the same as that of the optical transmitter 1A of the first embodiment. The same elements are denoted by the same numerical symbols and explanation is made of mainly different points from the first embodiment.

The optical transmitter 1B has an optical amplifier 31 connected to the output of the optical modulator 12, and a controller 15B that monitors amplified modulated light signal and controls the ratio between the pilot component and DC component in the monitor signal so as to be constant. As in the first embodiment, a low frequency pilot signal is superimposed onto the driving amplitude or the substrate bias voltage applied to the optical modulator 12. When the modulation depth less than 100% is selected, a pilot component appears in the output light from the optical modulator 12.

The controller 15B has a constant output controller 156, in addition to a photo detector 151, a DC monitor 152, an AC monitor 153, and a ratio controller 155. The constant output controller 156 adjusts the gain of the optical amplifier 31 based upon the monitoring result of the DC monitor 152 to maintain the output light level constant. Consequently, the DC component of the output light, namely, the average optical power can be constant.

With the configuration of FIG. 10, the monitoring level at the photo detector 151 is enhanced and the control accuracy is improved. Because the DC component is kept constant, the control scheme for maintaining the ratio between the pilot component and the DC component is simplified such that the pilot component of frequency f0 becomes constant.

Regardless of change in wavelength of the light source 11 or change over time occurring in the optical waveguides 12a and 12b of the optical modulator 12, the modulation depth set to an arbitrary level can be maintained constant. Temperature change may be stabilized by the modulator temperature controller 25 using, for example, a Peltier device. The constant output controller 156 is not necessarily provided inside the controller 15B, and it may be provided separately from the controller 15B.

In place of or in combination with the optical amplifier 31, a variable optical attenuator may be used. In this case, the controller 15B controls the attenuation of the variable optical attenuator so as to be constant such that the DC component in the output light from the optical modulator 12 becomes constant, and controls the amplitude of the drive signal or the substrate bias voltage level so as to keep the pilot component constant. As still another modification, the output level of the light source 11 may be controlled such that the DC component in the output light from the optical modulator 12 becomes constant.

Third Embodiment

Figure 11:
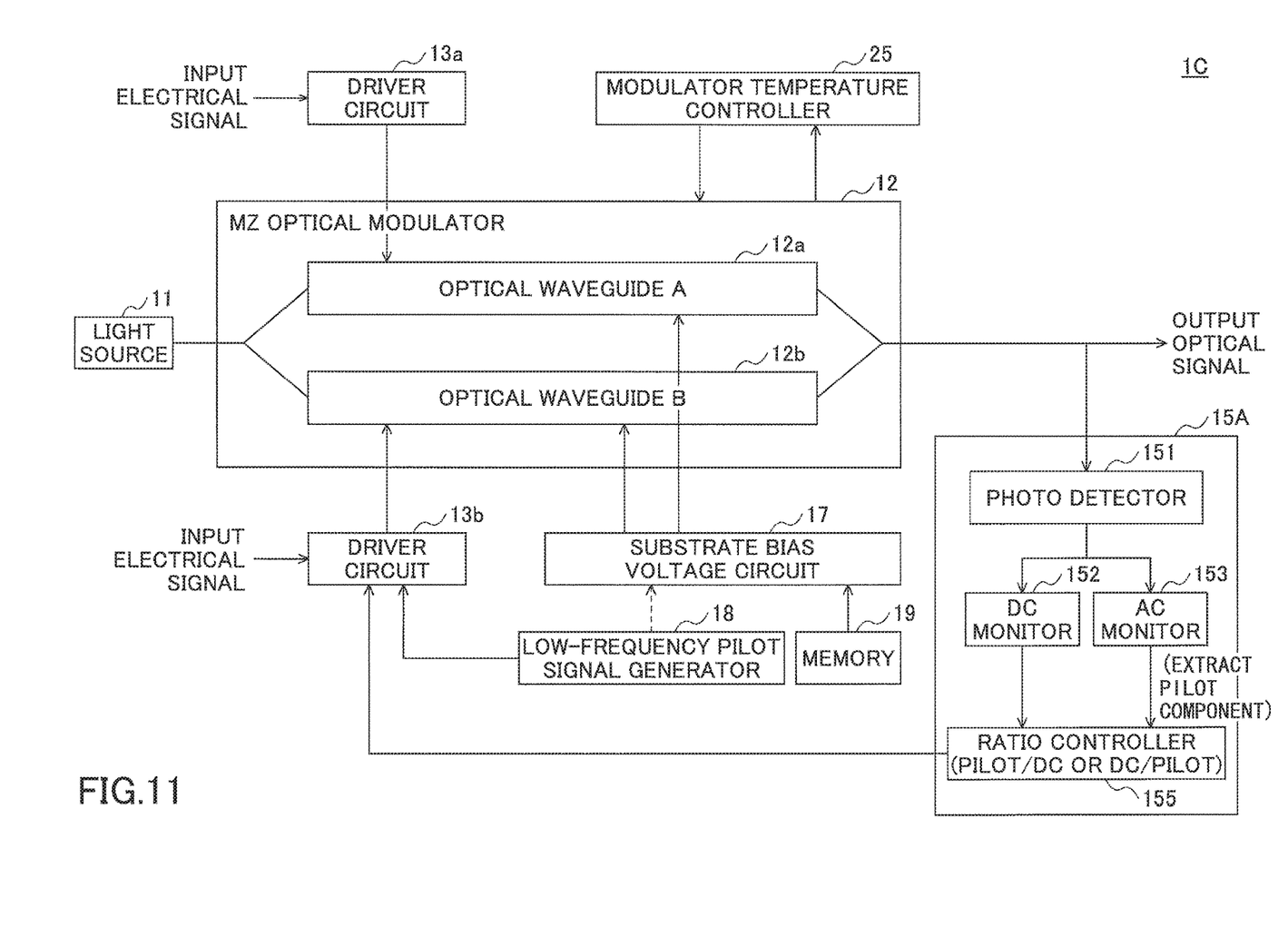
FIG. 11 is a schematic diagram of an optical transmitter according to the third embodiment.

FIG. 11 is a schematic diagram of an optical transmitter 1C according to the third embodiment. The basic structure of the optical transmitter 1C is the same as that of the optical transmitter 1A of the first embodiment. The same elements are denoted by the same numerical symbols and explanation is made of mainly different points from the first embodiment.

In the third embodiment, a memory 19 is connected to the substrate bias voltage circuit 17 to perform feed-forward control on the substrate bias voltage. The memory 19 has, for example, a table or an arithmetic expression describing a relationship between wavelength of the light source 10 and substrate bias voltage. The substrate bias voltage circuit 17 reads out the table or the arithmetic expression from the memory 19 and determines a substrate bias voltage level according to the wavelength of the light source 10. The temperature of the optical modulator 12 is controlled by the modulator temperature controller 25.

The controller 15A is one used in the first embodiment. The controller 15A monitors a portion of the light signal output from the optical modulator 12 at the photo detector 151, and detects a DC component (average optical power) and a pilot component contained in the monitor signal at the DC monitor 152 and the AC monitor 153, respectively. The ratio controller 155 controls the amplitude of the drive signal applied to the optical modulator 12 such that the ratio between the pilot component and the DC component becomes constant. A pilot signal may be superimposed on the drive signal or the substrate bias voltage.

In the third embodiment, wavelength dependency of the optical modulator 12 is dealt with by feed-forward control, and temperature change is dealt with by a temperature control device such as a Peltier device. Change over time occurring in the optical modulator 12 is dealt with by feedback control using a pilot signal. With this configuration, the modulation depth can be maintained constant at a desired level regardless of change in wavelength of the light source 10, change in temperature, or change over time. The structure of the third embodiment is advantageous especially when the optical modulator 12 is a semiconductor optical modulator.

Fourth Embodiment

Figure 12:
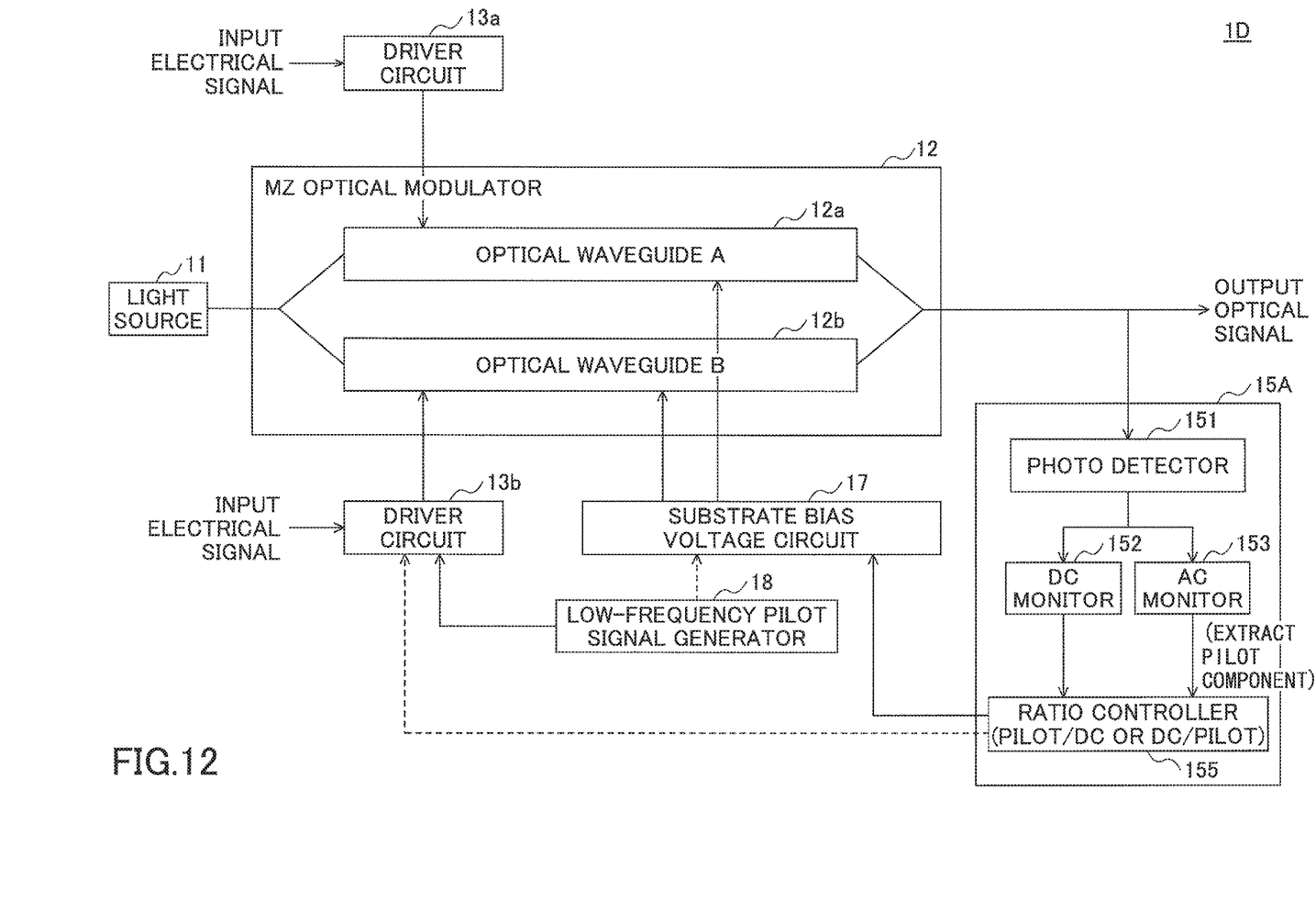
FIG. 12 is a schematic diagram of an optical transmitter according to the fourth embodiment.

FIG. 12 is a schematic diagram of an optical transmitter 1D according to the fourth embodiment. The basic structure of the optical transmitter 1C is the same as that of the optical transmitter 1A of the first embodiment. The same elements are denoted by the same numerical symbols and explanation is made of mainly different points from the first embodiment.

In the fourth embodiment, the modulator temperature controller 25 and the memory 19 are eliminated, and feedback control is performed to deal with all of the change over time, temperature change, and change in wavelength of the light source 11 in order to maintain the modulation depth at a desired level. A low frequency pilot signal generator 18 generates and superimposes a low frequency pilot signal onto a drive signal or a substrate bias voltage. A controller 15A monitors a portion of the light signal output from the optical modulator 12. The DC monitor 152 and the AC monitor 153 of the controller 15A detect a DC component and a pilot component, respectively, from the monitor signal (i.e., the output light from the optical modulator 12). A ratio controller 155 controls a substrate bias voltage such that the ratio between the pilot component and the DC component becomes constant. In place of the control on the substrate bias voltage, the amplitude of the drive signal may be controlled.

The configuration of the optical transmitter 1D of the fourth embodiment is advantageous from the viewpoint of eliminating temperature control and feed-forward control on the substrate bias of the optical modulator 12. This configuration is also suitable for an optical transmitter using a semiconductor optical modulator.

Fifth Embodiment

Figure 13:
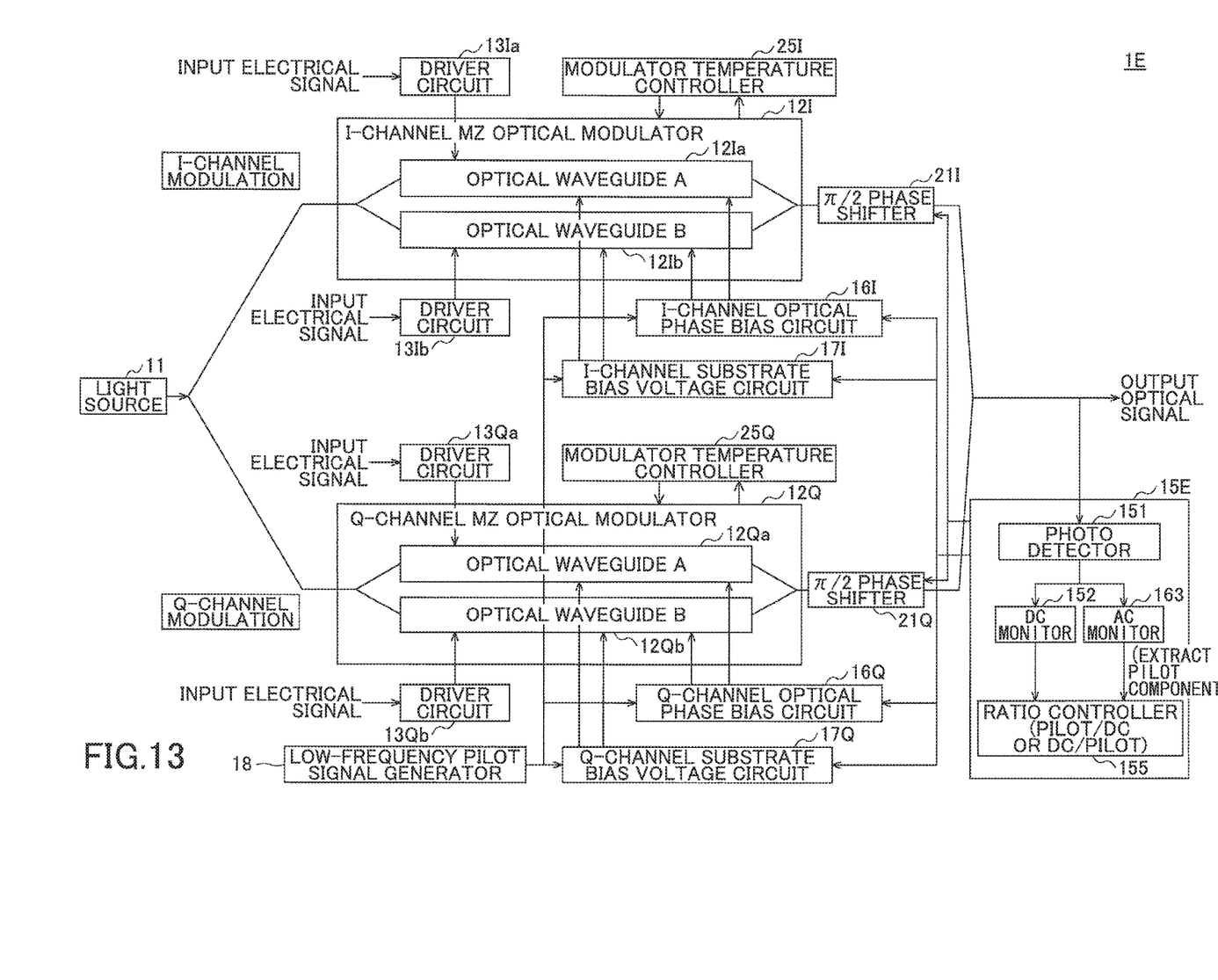
FIG. 13 is a schematic diagram of an optical transmitter according to the fifth embodiment.

FIG. 13 is a schematic diagram of an optical transmitter 1E according to the fifth embodiment. The basic structure of the optical transmitter 1E is the same as that of the optical transmitter 1A of the first embodiment. The same elements are denoted by the same numerical symbols and explanation is made of mainly different points from the first embodiment.

The optical transmitter 1E is used for an x-QAM modulation scheme. QAM or quadrature amplitude modulation is a form of modulation in which two sine waves with a $\pi/2$ (90-degree) phase difference between them are amplitude-modulated independently and combined together. A pair of Mach-Zehnder (MZ) optical modulators 12I and 12Q are used to provide a combination of phase shift from 0 radians to $\pi$ radians and phase shift from $\pi/2$ radians to $3\pi/2$ radians. Using multiple amplitude levels, a higher-order multi-level modulation is provided. A desired modulation depth is achieved by setting the phase rotation of light waves modulated at the optical waveguides 12Ia and 12Ib and the phase rotation of light wave modulated at the optical waveguides 12Qa and 12Qb to an appropriate value less than $\pi$ radians.

When an electrical signal with a single amplitude level is supplied to the I (in-phase) channel modulator and the Q (quadrature) channel modulator, 4-QAM, that is, QPSK is performed. When electrical signal supply is turned off at one of the I and Q channels, then 2-QAM is provided and BPSK illustrated in FIG. 3 is performed. When electrical signals with two different amplitude levels are used, 8-QAM is provided and 3 bits information per symbol can be transmitted. With electrical signals with 4 signal levels, 16-QAM is provided and 4 bits information per symbol is transmitted.

A light beam emitted from the light source 11 is split into two paths and input to the MZ optical modulators 12I and 12Q, respectively. The MZ optical modulator 12I and the MZ optical modulator 12Q may be referred to as "I-channel modulator 12I" and "Q-channel modulator 12Q", respectively. In each of the I-channel modulator 12I and the Q-channel modulator 12Q, the input light is split into two and guided to an optical waveguide A and an optical waveguide B. The output of the I-channel modulator 12I undergoes phase rotation at a $\pi/2$ phase shifter 21I. Similarly, the output of the Q-channel modulator 12Q undergoes phase rotation at a $\pi/2$ phase shifter 21Q. The light waves output from the I-channel modulator 12I and the Q-channel modulator 12Q are combined after a $\pi/2$ phase difference is provide between the I-channel light wave and the Q-channel light and the combined light is output as a modulated optical signal.

A pilot signal generated at the low frequency pilot signal generator 18 is supplied to an I-channel substrate bias voltage circuit 17I, a Q-channel substrate bias voltage circuit 17Q, an I-channel optical phase bias circuit 16I, and a Q-channel optical phase bias circuit 16Q light beam emitted from the light source. The pilot signal is also supplied to the $\pi/2$ phase shifter 21I and the n/2 phase shifter 21Q. The signal lines from the low frequency pilot signal generator 18 to the $\pi/2$ phase shifter 21I and the $\pi/2$ phase shifter 21Q are omitted for the simplification purpose of the figure. The low frequency pilot signal is superimposed onto a substrate bias, an optical phase bias, and a $\pi/2$ phase shift bias. The optical phase bias is a bias voltage to define a statistic phase difference between the two optical waves of each of the MZ interferometers. In the figure, signal electrodes and optical phase bias electrodes provided to the optical waveguides 12Ia and 12Ib of the I-channel modulator 12I are omitted for the simplification purpose. For the same reason, signal electrodes and optical phase bias electrodes provided to the optical waveguides 12Qa and 12Qb of the Q-channel modulator 12Q are omitted in the figure.

After combining the I-channel light component and the Q-channel light component, a portion of the combined light is monitored at a photo detector 151 of a controller 15E. The controller 15E controls the ratio between a pilot component and a DC component contained in the monitored light so as to be constant, using a DC monitor 152, an AC monitor 163, and a ratio controller 155. A first control signal for keeping the pilot/DC (or DC/pilot) ratio constant is supplied to the I-channel substrate bias voltage circuit 17I and the Q-channel substrate bias voltage circuit 17Q.

A pilot component originating from the pilot signal superimposed onto the optical phase bias is detected by the AC monitor 163. The AC monitor 163 generates a second control signal for minimizing the pilot component contained in the output lights from the I-channel modulator 12I and the Q-channel modulator 12Q. The controller 15E supplies the second control signal to the I-channel optical phase bias circuit 16I and the Q-channel optical phase bias circuit 16Q. The AC monitor 163 also generates a third control signal for providing a π/2 phase difference between the light waves output from the I-channel modulator 12I and the Q-channel modulator 12Q. The controller 15E supplies the third control signal to the π/2 phase shifter 21I and the π/2 phase shifter 21Q. The third control signal is for minimizing the AC components contained in the output lights of the I-channel modulator 12I and the Q-channel modulator 12Q. The AC monitor 163 may include two separate monitor circuits, one for detecting a pilot component from the monitor signal and one for detecting alternating current (AC) power from the monitor signal. The monitor circuit for detecting a pilot component has a frequency band of several hundred kilohertz (kHz) that corresponding to the low frequency of the pilot signal. On the other hand, the monitor circuit for detecting AC power (for square-low detection) has a frequency band of several hundred megahertz (MHz).

Control operations on substrate bias, optical phase bias, and π/2 shift bias can be implemented by analog electronic circuits or digital signal processing. Separate circuits may be provided for substrate bias control, optical phase bias control, and π/2 shift bias control to achieve parallel operations. From the viewpoint of downsizing the circuit structure, time sharing control using a CPU may be effective.

In place of superimposing a low frequency pilot signal onto the substrate bias voltage, a pilot signal may be superimposed onto a drive signal. In this case, in-phase pilot signals may be applied to driver circuits 13Ia and 13Ib. Similarly, in-phase pilot signals may be applied to driver circuits 13Qa and 13Qb. In place of controlling a substrate bias voltage with the first control signal, driving amplitude may be controlled. Modulator temperature controllers 25I and 25Q may be eliminated, and the first control signal may be used to cancel the fluctuation of the modulation depth caused by temperature change.

The controller 15E may be furnished with the constant DC output structure of the second embodiment. In this case, a DC component of a constant level is acquired from the output signal from the modulator, and the first control signal is used to control the substrate bias or the driving amplitude such that the detected low frequency pilot component becomes a predetermined level.

Sixth Embodiment

Figure 14:
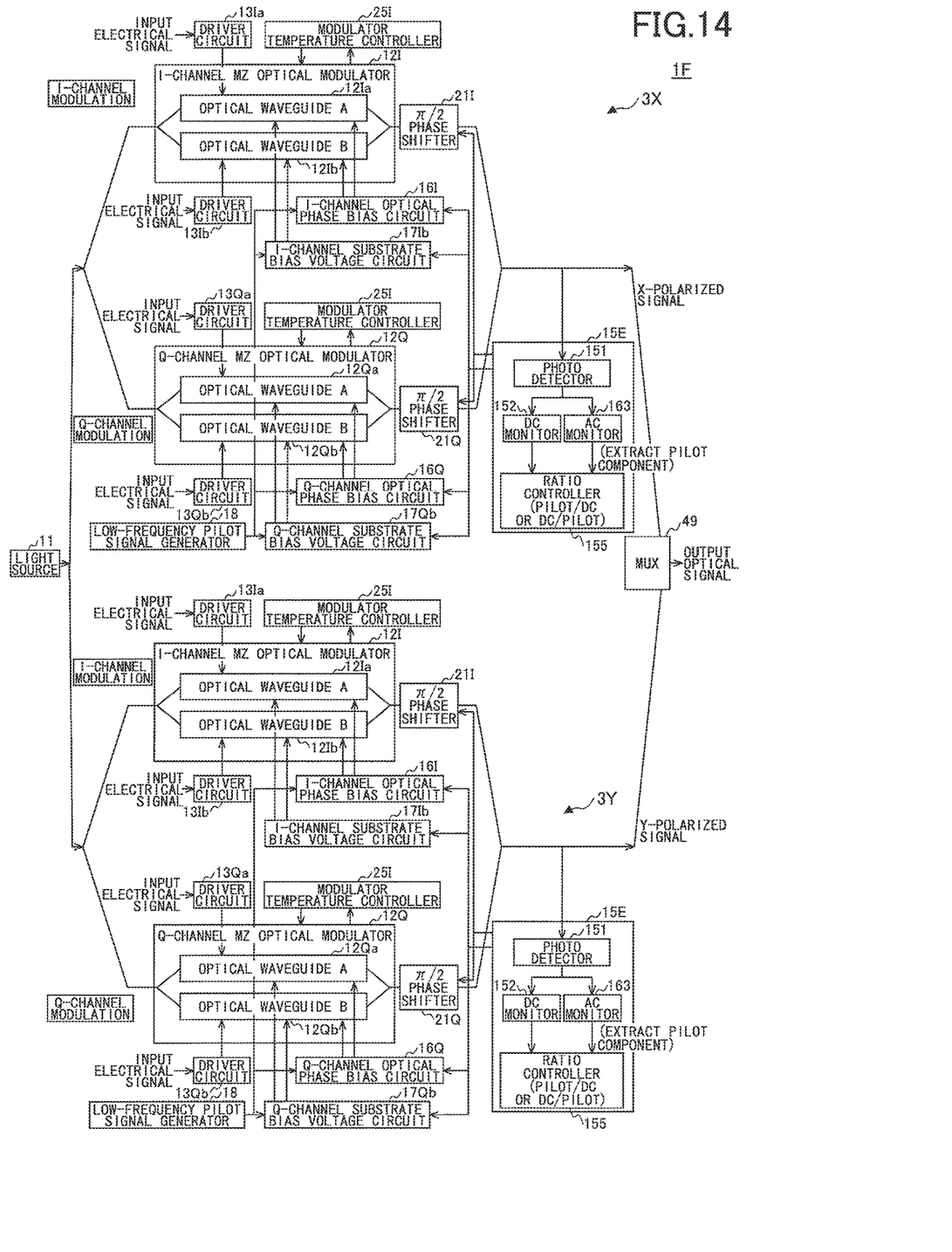
FIG. 14 is a schematic diagram of an optical transmitter according to the sixth embodiment.

FIG. 14 is a schematic diagram of an optical transmitter 1F according to the sixth embodiment. In the sixth embodiment, the modulation depth control scheme based upon the ratio between the pilot component and the DC component is applied to dual polarization QAM modulation (DP-QAM).

The optical transmitter 1F has an X-polarized tributary optical modulation block 3X and a Y-polarized tributary optical modulation block 3Y. The structure of each of the X-polarized and Y-polarized tributary optical modulation block 3X and 3Y is the same as that illustrated in FIG. 13 and redundant explanation will be avoided.

A light beam emitted from the light source 11 is split into two paths and guided to the X-polarized tributary optical modulation block 3X and the Y-polarized tributary optical modulation block 3Y. In each of the modulation blocks 3X and 3Y, the light beam is further split into two paths and input to a Mach-Zehnder optical modulator 12I (referred to as an "I-channel modulator 12I") and a Mach-Zehnder optical modulator 12Q (referred to as a "Q-channel modulator 12Q"). A controller 15E is provided to each of the modulation blocks 3X and 3Y. The controller 15E outputs a first control signal, a second control signal, and a third control signal. The first control signal is for maintaining the ratio between the pilot component and the DC component contained in the modulated light signal. The second control signal is for controlling an optical phase bias between two optical waveguides of a MZ interferometer. The third control signal is for controlling a π/2 shift bias voltage. By controlling a substrate bias or a driving amplitude using the first control signal such that the ratio between the pilot component and the DC component becomes a predetermined constant value, the modulation depth can be maintained at a desired level regardless of variable factors. In place of providing the separate controllers 15E to the X-polarized tributary optical modulation block 3X and the Y-polarized tributary optical modulation block 3Y, a portion of the output light from the polarization multiplexer (MUX) circuit 49 may be branched as a monitor light. The controller 15E may be furnished with the constant DC output structure of the second embodiment. In this case, a DC component of a constant level is acquired from the output signal from the modulator, and the first control signal is used to control the substrate bias or the driving amplitude such that the detected low frequency pilot component becomes a predetermined level. In FIG. 14, a polarization rotator provided to one of the X-polarized tributary optical modulation block 3X and the Y-polarized tributary optical modulation block 3Y is omitted for the simplification purpose.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:
1. An optical transmitter comprising:
    an optical modulator with a Mach-Zehnder interferometer,
    a pilot signal generator configured to generate a pilot signal to be superimposed on a drive signal for driving the optical modulator or on a substrate bias voltage applied to the optical modulator, a monitor circuit that detects a ratio between a pilot component and a direct current component contained in a light output from the optical modulator; and a processor that controls at least one of an amplitude of the drive signal for driving the optical modulator and a level of the substrate bias voltage applied to the optical modulator such that the ratio becomes a constant value, wherein the ratio between the pilot component and the direct current component is maintained constant so as to achieve a predetermined optical phase modulation depth of a main signal output from the optical modulator, the ratio being determined according to a modulation scheme of the optical transmitter.

2. The optical transmitter as claimed in claim 1, wherein the monitor circuit has a photo detector configured to convert the light output from the optical modulator into an electrical signal, a first monitor configured to detect the direct current component from the electrical signal, and a second monitor configured to detect the pilot component from the electrical signal, and the processor maintains the ratio between the pilot component and the direct current component at the constant value.

3. The optical transmitter as claimed in claim 1, wherein the processor maintains a power level of the direct current component at a constant level and controls a power level of the pilot component so as to be a predetermined level.

4. The optical transmitter as claimed in claim 3, further comprising:

a light level adjuster configured to adjust an output level of the optical modulator;

wherein the processor adjusts a gain or an attenuation of the light level adjuster such that the power level of the direct current component becomes the constant level.

5. The optical transmitter as claimed in claim 1, wherein the optical modulator is a semiconductor optical modulator.

6. A method of controlling an optical modulator, comprising:

superimposing a pilot signal onto a drive signal for driving an optical modulator with a Mach-Zehnder interferometer or onto a substrate bias voltage applied to the optical modulator;

detecting a ratio between a pilot component and a direct current component contained in a light output from the optical modulator; and controlling an amplitude of the drive signal or a level of the substrate bias voltage such that the ratio becomes a constant value, wherein the ratio between the pilot component and the direct current component is maintained constant so as to achieve a predetermined optical phase modulation depth of a main signal output from the optical modulator, the ratio being determined according to a modulation scheme of the optical transmitter.

7. The method as claimed in claim 6, wherein a power of the direct current component is controlled to a constant level and a power level of the pilot component is controlled so as to be a predetermined level.

* * * * *